Sept. 2, 1941.  J. D. FURDAS  2,254,800
CASTING BOBBER
Filed Aug. 24, 1940
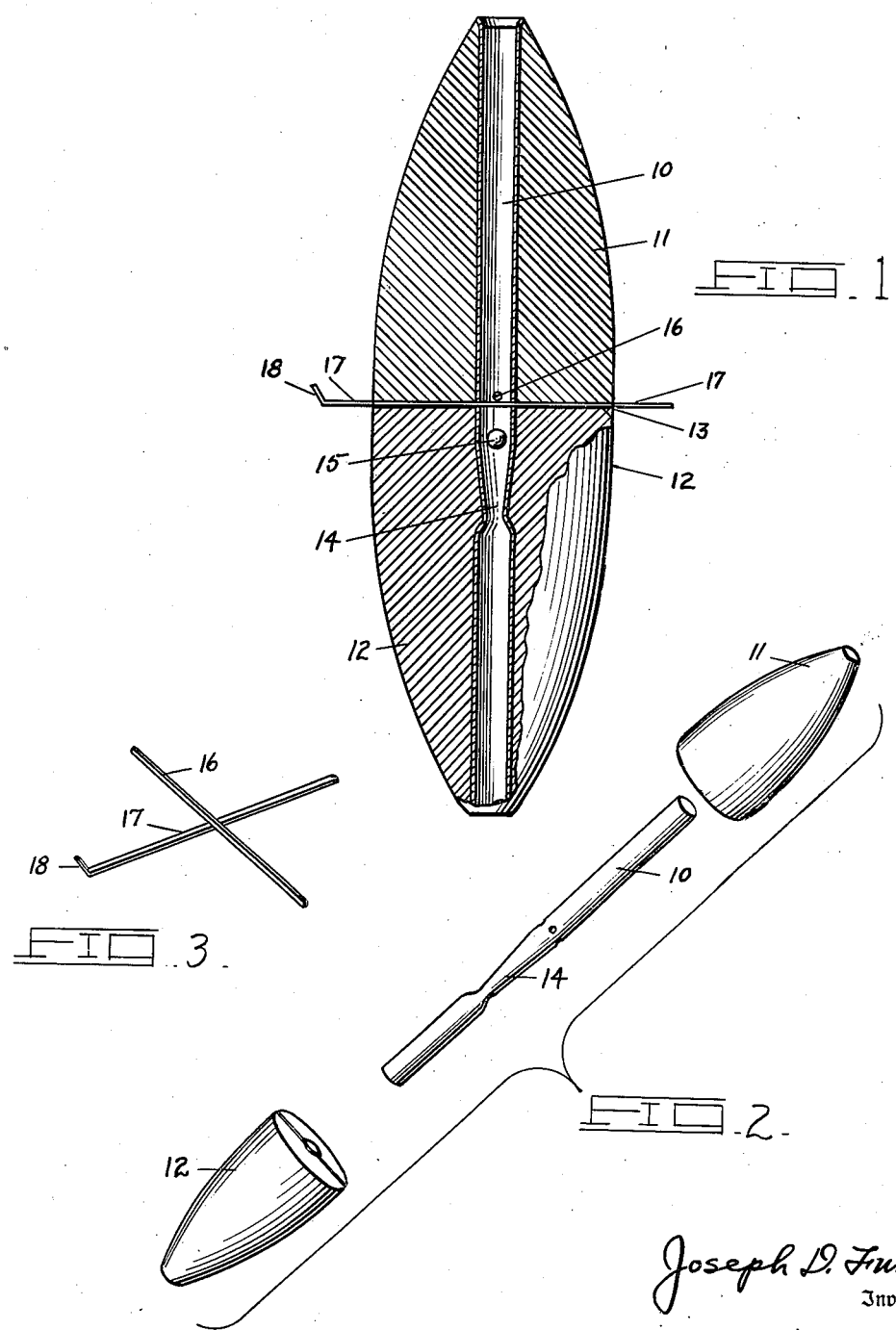

Patented Sept. 2, 1941

2,254,800

UNITED STATES PATENT OFFICE 2,254,800

CASTING BOBBER

Joseph D. Furdas, Youngstown, Ohio

Application August 24, 1940, Serial No. 353,995

4 Claims. (Cl. 43—49)

This invention relates to a casting bobber.

The principal object of the invention is the provision of a casting bobber for use in fishing so formed that the fishline may be conveniently positioned therethrough and adjusted to desirable fishing depths with respect to the surface of the water, and the remainder of the line wound thereon so that the bobber may be cast to a desired location at which time the line will unwind from the said bobber and lower the hook and bait associated therewith to the predetermined depth.

A further object of the invention is the provision of a bobber formed of relatively few parts and in effect built around a centrally positioned tube through which the fishline is passed.

A still further object of the invention is the provision of a casting bobber provided with an axially extending orifice therethrough and means formed in the orifice for gripping a fishline that may be passed therethrough so as to securely position the casting bobber on the fishline.

The casting bobber shown and described herein has been designed to permit a fisherman to predetermine the depth at which he wishes the bait placed in relation to the bobber and, further, to enable the fisherman to wind this predetermined length of fishline and tackle upon the bobber itself and temporarily attach the same thereto so as to permit the bobber and its assembled tackle to be cast to a desirable fishing location. The bobber is so formed that upon striking the water the portion of the tackle wound thereon will immediately unwind and thus place the fishing tackle in desirable position with respect to the depth of the water being fished.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed without departing from the spirit of the invention.

The invention is illustrated in the accompanying drawing, wherein:

Figure 1 is a cross sectional side elevation of the casting bobber.

Figure 2 is a composite view showing the various parts of the fishing bobber in unassembled relation.

Figure 3 is a perspective view of a portion of the bobber shown in Figure 1.

By referring to the drawing and Figures 1 and 2 in particular it will be seen that the casting bobber comprises a conventionally shaped bobber having an axially extending tube 10 preferably formed of thin light metal positioned therein about which two half sections 11 and 12 of suitable float material, such as cork or light wood, are positioned and affixed to one another at a joint 13 so that they form, with respect to the tube 10, a complete bobber body. By referring to Figure 1 of the drawing in particular it will be noted that the axially extending tube 10 is provided with a crimped section 14 forming a restricted orifice therein at a point somewhat below a center line thereof which crimped section 14 provides a stop for a ball 15 positioned in the tube 10. It will be observed that the ball 15 is of a size which will prevent it from passing through the restricted orifice of the crimped section 14 and that by the same token any fishline which may be threadably positioned through the tube 10 of the fishing bobber will be subject to a clamping action by the ball 15 in conjunction with the crimped section 14 at such times as the line is pulled downwardly therethrough. This feature enables a fishline threadably positioned in the tube 10 of the bobber to be affixed to the bobber by the clamping action of the ball 15 against the crimped section 14. It will also be observed that the ends of the tube 10 are beveled so as to avoid the formation of a sharp edge over which the fishline might fray.

By referring to Figures 1 and 3 it will be observed that means have been provided for preventing the ball 15 from moving outwardly of the tube 10 so as to keep the ball 15 in effective operative position at all times. The means comprise a pair of rods 16 and 17 positioned at right angles through the tubular member 10 so as to form an effective stop for the ball 15. The rod 17 is provided with an upturned hooklike end 18 upon which the tackle may be conveniently hooked after the same has been wound around the various protruding ends of the rods 16 and 17.

By referring now to Figure 2 of the drawing it will be observed that the bobber may be conveniently and quickly assembled by simply sliding the two half sections of float material 11 and 12 over the opposite ends of the tube 10 and affixing the same together and to the tube 10 by means of a suitable water proof adhesive material. The bobber thus partially formed is completed by the insertion of the ball 15 through the uppermost end of the tube 10 and the positioning of the rods 16 and 17 through the preformed openings in the tube 10. It is obvious that the mode of assembly may be varied somewhat as, for example, the rods 16 and 17 might be positioned through the tube 10 prior to the assembly of the half sections of float material 11 and 12.

It will thus be observed that a casting bobber has been designed which will, due to its unique formation, permit the fishing tackle and predetermined section of fishline carrying the tackle to be unwound thereabout and at the same time insure the accurate positioning of the bobber with respect to the fishing tackle. It will also be observed that when the bobber has been cast the tackle will unwind therefrom due to the natural tendency of the weight thereof drawing the same downwardly causing the fishline to slip from the projecting ends of the rods 16 and 17 until the tackle has been completely unwound therefrom. At such time the casting bobber will assume an upright position, as shown in Figure 1, and with the fishline emerging from the opening in the top thereof it may also be pointed out that when the fish has been caught on the tackle associated with the casting bobber and the same reeled in to the tip of the fishing rod the action of the ball 15 against the line passing through the tube 10 in the interior of the casting bobber will release and thus permit the fish to be brought much closer to the fisherman than would otherwise be the case.

What I claim is:

1. A casting bobber comprising a tubular body member, a pair of half section float members affixed thereto, a restricted throat formed in the said tubular body member, and a pair of rods positioned crossways through the said tubular body member so as to limit the movement of a ball positioned in the said tubular body member between the said rods and the said throat.

2. In a casting bobber comprising a bobber of suitable floating material a tubular member positioned axially therethrough, a restricted orifice formed in said tubular member, a ball positioned in said tubular body member adjacent said restricted orifice, and cross arms positioned through the said casting bobber so as to retain the said ball in operative position therein and serve as means for winding fishing tackle on the exterior portions thereof.

3. In a casting bobber comprising a section of suitable float material a centrally positioned axially extending tubular member therein, a restricted section formed in said tubular member, and cross arms positioned through said float material and through said tubular member adapted to form projections upon which fishing tackle may be wound and to retain a ball in operative position in the said tubular member adjacent the said restricted orifice therein.

4. In a casting bobber comprising a section of suitabe float material a centrally positioned axially extending tubular member therein, a restricted section formed in said tubular member, cross arms positioned through said float material and through said tubular member adapted to form projections upon which fishing tackle may be wound and to retain a ball in operative position in the said tubular member adjacent the said restricted orifice therein, and an upturned hook like end formed on one of the said cross members adapted to receive a portion of the fishing tackle thereon.

JOSEPH D. FURDAS.